United States Patent [19]

Kneer

[11] 4,062,770

[45] Dec. 13, 1977

[54] METHOD OF AND APPARATUS FOR DIGESTING ORGANIC WASTE AND/OR SEWAGE SLUDGE

[75] Inventor: Franz Xaver Kneer, Hanau-Mittlebuchen, Germany

[73] Assignee: Gebruder Weiss K.G., Dillenburg, Germany

[21] Appl. No.: 709,378

[22] Filed: July 28, 1976

[30] Foreign Application Priority Data

Sept. 15, 1975 Germany .............................. 2541070

[51] Int. Cl.$^2$ ........................... C02C 1/12; C05F 9/02
[52] U.S. Cl. ..................................... 210/12; 23/259.1; 71/9; 210/15; 210/71; 210/96 R; 210/149; 210/151; 210/180; 210/182; 210/258
[58] Field of Search .................. 23/259.1; 55/33; 71/9; 210/10, 12, 15, 63 R, 71, 96 R, 149, 151, 180, 181, 182, 258; 261/76

[56] References Cited

U.S. PATENT DOCUMENTS

| | | | |
|---|---|---|---|
| 1,597,724 | 8/1926 | Cooke | 71/9 |
| 2,474,833 | 7/1949 | Eweson | 71/9 |
| 3,138,448 | 6/1964 | Schulze | 71/9 |
| 3,178,267 | 4/1965 | Larson | 71/9 X |
| 3,314,765 | 4/1967 | Abson et al. | 23/259.1 |
| 3,390,076 | 6/1968 | Dubach | 261/76 X |
| 3,531,916 | 10/1970 | Kulperger et al. | 55/33 |
| 3,756,784 | 9/1973 | Pittwood | 71/9 X |

FOREIGN PATENT DOCUMENTS

2,426,285   12/1975   Germany .................................. 71/9

*Primary Examiner*—Wilbur L. Bascomb, Jr.
*Assistant Examiner*—Robert H. Spitzer
*Attorney, Agent, or Firm*—Toren, McGeady and Stanger

[57] ABSTRACT

Organic waste and/or sewage sludge is digested by passing it downwardly through a closed vessel while air is passed upwardly through it. The air is finely divided or distributed into the vessel so that it flows through the entire cross sectional area of the material being digested. The flow of air through the vessel is regulated by measuring the content of $CO_2$ or $O_2$ in the exhaust air from the vessel and comparing the measured value with a desired value. Similarly, the moisture content of the material being digested is measured in at least two spaced locations and the moisture content is compared with a desired value for determining the amount of water to be supplied into the air flowing into the vessel. In addition, the air supplied to the vessel is heated based on the temperature conditions to be maintained within the vessel. After exhaust air leaves the vessel, its heat and water contents are withdrawn and it is filtered to remove objectionable odors and other noxious matters.

11 Claims, 1 Drawing Figure

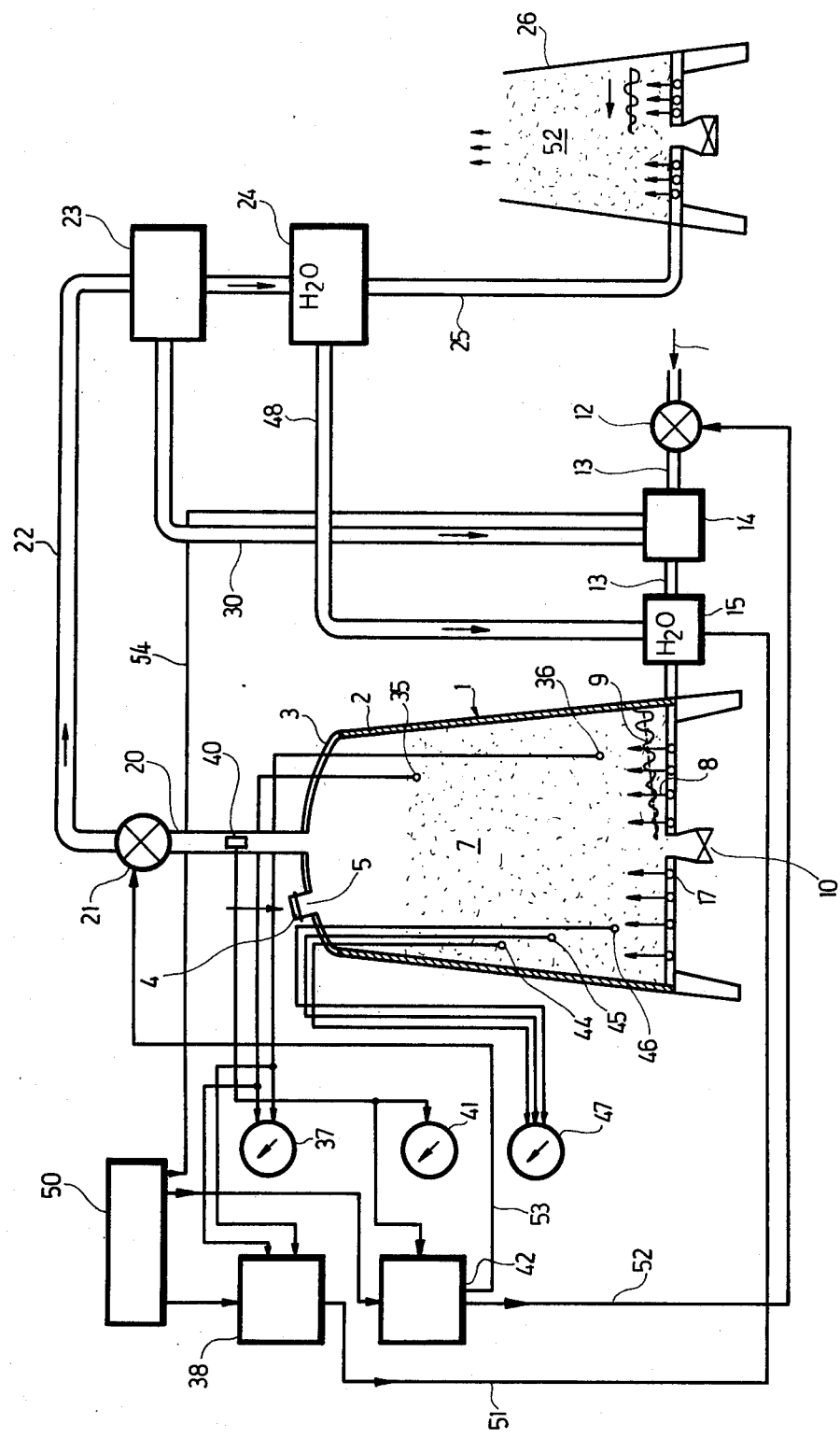

METHOD OF AND APPARATUS FOR DIGESTING ORGANIC WASTE AND/OR SEWAGE SLUDGE

SUMMARY OF THE INVENTION

The invention is directed to a method of and apparatus for continuously digesting organic waste and/or sewage sludge in which the material being digested passes downwardly through a closed reaction vessel and is aerated by upwardly flowing air, the quantity of which is regulated in accordance with measured values obtained within the reaction vessel.

In the composting or digesting of organic wastes, so-called aerobic digestion has been widely adopted and such process is actually odorless because the active bacteria used has an affinity for oxygen. The aerobic digestion also develops higher temperatures in the process than the so-called anaerobics which are active in oxygen deficient environments and generate very offensive odor conditions. The generation of high temperatures is extremely important for sterilizing the material being digested.

In commencing the digestion process, the presence of moisture and the correct air and/or oxygen content are decisive characteristics in consideration of the type of material being digested.

Because of the great increase in the quantity of wastes generated in the present day industrial society, there have been many attempts to accelerate the digestion process of organic waste within digestion plants. In nature the digestion process takes place very slowly and requires a large area. To save both space and personnel, the digestion process is performed in closed aeration reaction vessels.

In a method disclosed in the German Offenlegungsschrift No. 2,201,789, a mixture of trash and sewage sludge is supplied to the upper end of an enclosed aeration reaction vessel via a charging valve and the digested material is continuously discharged from the base of the vessel through an outlet device. Transversely of the direction of movement of the material through the vessel, oxygen-enriched air is injected through a centrally arranged pipe traversing the vessel and the pipe rotates at an adjustable speed. The air introduced into the vessel is withdrawn at the vertical side walls through grates and suction devices. As a result, the reaction vessel is divided into three different zones for maintaining the air for the individually superposed zones at the desired temperature and moisture content. The quantity of air supplied can be controlled as a function of the following: the temperature of the contents of the reaction vessel, the $CO_2$ content in the air withdrawn from the individual zones, the supply air resistance, and the moisture of the withdrawn air. In the disclosure it states that with the selected air conduction arrangement, nine different aeration variants can be selected; for instance, all zones can be aerated and de-aerated uniformly, only the central zone can be aerated and deaerated, air can be supplied into the bottom zone and drawn off from the top zone, and so on.

Independently of the various control possibilities indicated, this type of air flow has the result that it is not possible for the material being processed to be completely digested. In fact, the air introduced into the reaction vessel cannot permeate through the body of material which moves crosswise to the air flow, instead the air divides into partial streams directed toward the individual suction grates. Since the heat flow in the material being digested depends on the presence of moisture and because the moisture cannot be distributed evenly through the material due to the manner in which the air flows crosswise to the movement of the material, in the immediate vicinity of the air inlet pipe the material will assume the approximate temperature of the air supplied and this characteristic will apply over the total height of the body of material in the vessel. However, the edge zones will have different temperatures over the height of the material and it is inevitable due to the spaced relation between the edge zones and the rotating air supply pipe that zones of dry material will develop. Accordingly, the material adjacent the air supply pipe remains undigested, leading to considerable disturbances in the digestion process and eventually resulting in the failure of the continuous digestion process. Another danger is the possibility, resulting from the separated flows of air, that moisture pockets will form in which anaerobic bacteria will take over and result in the development of an intense malodorous condition.

In U.S. Application Ser. No. 579,880, filed May 22, 1975, a method of controlling the digestion process of organic wastes and sewage sludge has been described in which the material being processed moves downwardly within an aerating reaction vessel while the air flows countercurrently to the material upwardly from the base of the vessel. In this process, the air supply, and the air may be enriched with pure oxygen, is controlled in such quantities that the zone of lowest temperature is at the base of the vessel and the highest temperature is in the upper layer of the material with the zone of lowest oxygen content being in the upper layer and the zone of highest oxygen content located at the base. In this process, with the exact maintenance of the parameters influencing the digestion process which are controlled primarily by the air supply, a different heat and oxygen stratification is developed as well as a different distribution of specific bacteria, such that within the material passing through the vessel there is different aerobic and anaerobic bacterial activity which is optimal for the digestion process within the vessel. Based on this complicated arrangement, a satisfactorily sterile, biologically active, valuable humus material is obtained as the end product.

To achieve this end, however, an exact control of the digesting process is necessary, otherwise neither optimization, for instance with respect to the duration of the process and the quality of the end product, nor its maintenance can be achieved.

If there is an excessive supply of air, the material within the vessel is dried out and the bacterial activity collapses. If there is too little air supplied, the amount of anaerobic bacteria increases greatly. Moreover, if the discharge from the vessel is not uniform, the digestion process is disturbed since a partial drying out of the material will develop at the base of the vessel. Therefore, as experience has indicated, the biological equilibrium in the material being processed is also effective. Further, in addition to the possible development of unpleasant odor conditions, the digestion process may fail.

As is known, the operation of the digestion process in an aerating reaction vessel depends on the moisture content of the material charged into the vessel, its packed density, and, in particular, the moisture of the material within the vessel. These various parameters must be taken into consideration in adjusting the air supply with the related availability of oxygen for the bacteria, to prevent any irregularities in the digestion process, particularly in multiplication of anaerobic bacterial strains and interruption of the activity of the bacteria. In this connection, maintaining of the necessary moisture content is very important. Any partial drying out of the material leads to irregularities in the heat flow and favors further drying out, because dry material is known to be a less effective heat conductor than moist material. With such drying action, the bacterial activity fails and the caking of the material within the vessel takes place leading to problems in discharge of the material. Further, exhaust air from the vessel, normally open at the top, contains a disproportionately large amount of noxious odors. Attempts have been made to moisten the contents of the vessel from above, however, in digesting processes using countercurrent flow this is not possible due to the heat accumulation zone which forms in the upper third of the vessel. Exact control of such processes is difficult and requires considerable experience on the part of the operating personnel.

In U.S. Pat. No. 3,138,448 the control of the air supply for an aerating reaction vessel used in digesting organic wastes is disclosed and the control is a function of the temperature or of the values of a gas analysis of the exhaust air leaving the vessel, or of both parameters taken jointly.

This aerating reaction vessel, however, works batchwise, not continuously, and the air supply is controlled through a switching regulator which either fully opens or fully closes a valve in the supply line, so that an interrupted flow of air for the material being digested, takes place. Although in another embodiment, a throttle valve is described for limiting the air supply, a description of the operation indicates that there is an interruption of the air supply giving the bacteria time to consume the oxygen by respiration, accordingly, it must be assumed that there was considered to be an intermittent withdrawl of the material being digested.

Apart from the fact that batchwise operation is complicated, such an air flow arrangement does not permit an optimum digestion of the organic waste. The intermittent removal of the material involves the danger that the material may dry out and also causes continually changing temperatures within the material, so that the bacterial activity is greatly disturbed and the material withdrawn will only be in a dried out half-digested condition.

Accordingly, it is the primary object of the present invention to provide a new digestion process for the production of an end product of high biological activity, that is, one still heavily charged with microorganisms, free of pathogenic bacilli and weed seeds, which process is automatically regulated on the basis of actual values checked during operation, that is, without any manual intervention during the digestion process and by a simple and exact regulation of the air and moisture supply effected during continuous operation. With this procedure an optimum digesting process is obtainable for any length of time for avoiding, as much as is possible, any irregularities in the biological equilibrium.

Starting with a method of the type described above, in accordance with the present invention, the entire air requirement for the digesting process flows through the material being processed from the base of the reaction vessel in counter-current flow and finely or evenly distributed over the entire cross section of the material. The air is regulated as to quantity and rate of flow by separately adjusting blowers which direct the air into the vessel and suction devices which draw the air out after its passage through the material being digested. In effecting such adjustment, actual values of the $CO_2$ or $O_2$ in the exhaust air are measured and compared against desired values. Further, the moisture content of the air is established by taking at least two moisture readings, preferably one within the lower third and the other within the upper third of the material in the vessel and comparing these with established values. The water for obtaining the desired moisture content of the material is added to the air, preferably in a finely divided form, before the air is directed into the base of the vessel. In addition, the air introduced into the base of the vessel is heated in the range of 30° to 50° C and preferably to 40° C. Therefore, in carrying out the method of the invention, the air traversing the reaction vessel is simultaneously blown in and withdrawn and the reaction vessel is closed at its upper end so that a vacuum can be produced above the level of the material in the vessel. Accordingly, both the quantity of the oxygen flowing through the vessel and the pressure difference between the base and the upper end of the vessel can be adjusted to the oxygen partial pressure in the different layers of the material. Based on the counter-current flow of material and air, a satisfactory aeration of the entire reaction vessel content is ensured. Another advantage gained is that, despite the fact that the heat accumulation zone is pushed upwardly as a result of the upwardly flowing air and the extremely important sterilization of the material, moisture can be supplied to the material in the reaction vessel so that it is possible to assure that the material does not dry out. Furthermore, based on the inventive method it is possible to regulate the flow of air passing through the reaction vessel if the other above-mentioned parameters are maintained, whereby the temperature stratification in the vessel can be influenced and optimized.

At startup, the initial charge of waste and/or sewage sludge is filled into the reaction vessel and is given sufficient time to effect digestion in the bottom layer. Subsequently, material can be charged into and removed from the vessel in a continuous manner affording adequate residence time within the vessel to effect complete digestion.

On the whole, therefore, based on given empirical values, by regulating the inflow and outflow of the air and its moisture supply, the biological conditions within the vessel can be influenced so that after the completion of startup, the process of digesting the continuously supplied waste and/or sewage sludge can proceed optimally for any desired length of time, independently of the skill of the operating personnel, that is, without any manual intervention. Based on an aerobic digesting process, the $CO_2$ content in the exhaust air must be between 2 and 5% with a mean theoretical value of about 3.5% $CO_2$ content.

In German Pat. No. 1,301,828 a method of digesting waste is disclosed where the exhaust air from a reaction vessel is withdrawn, however, a control of the air and moisture supply by introducing and withdrawing the air as a function of the state of the digesting process as indicated by the $CO_2$ content in the exhaust air is not provided, since a different digesting process is used and the reaction vessel is not a closed member during normal operation. In this patent approximately the same amount of air is introduced to all regions of the reaction vessel. This feature is to simulate the digesting process which takes place in nature, that is, where the material is deposited in a thin layer on the earth's surface and is continuously aerated by atmospheric oxygen. The described process, therefore, differs totally in its biology from that embodying the present invention. Therefore, in the known process there is no provision for control or regulation of the air supply as in the present invention.

Other features of the inventive process are evident from the claims, in particular, that the exhaust air is supplied into the base of another vessel containing a material serving as an absorbent for a biological filter which material consists of a highly biologically active digested material of the kind processed in the reaction vessel with the air being finely divided or distributed over the entire transverse cross section of the filter material. After its flow through the filter, the exhaust air is withdrawn in an odorless and noxious matter free condition.

By eliminating the odors formed during the digesting process, it is assured that the atmosphere is not polluted by the exhaust air. Even the odors which in a well-digested material originate from actinomycetes strains are filtered out. Several strains of these actinomycetes give off, during decomposition activity, strong cheese-like odors, which, although perfectly normal in a decomposing material, are considered to be unpleasant and disturbing. Another advantage of the present invention is that by filtering the exhaust air it is possible to operate without any recycled material, that is, without reintroducing digested material with newly added material for the purpose of removing the source of the odors. All odors developed during the introduction of fresh material are drawn off and absorbed in the filter. This arrangement results in a savings of up to about 40% of the digested material which can now be sold as humus and, in addition, the material can be processed more quickly than in the past.

An apparatus for carrying out the inventive process is characterized by a completely enclosed reaction vessel having a blower at its base for distributing a uniform flow of air over the entire cross sectional area of the material transverse to its direction of movement downwardly through the vessel. Further, a suction device of higher output than the blower is connected to the space above the material within the reaction vessel for drawing off exhaust air. A control circuit for regulating both the blower and the suction device is based on the measured $CO_2$ or $O_2$ values in the exhaust air after it leaves the reaction vessel. The desired adjustment, is any, is obtained by comparing the actual measured values with predetermined desired values. By this control arrangement the delivery quantity and the power of one or both the blower and the suction device is adjustable so that the theoretical values determined for the digestion process are established within the reaction vessel independently of the admission of fresh material and the discharge of digested material. Before the air is introduced into the base of the vessel a water-spraying device provides a finely divided flow of water into the air and the flow is regulated by a control circuit based on measurements of the moisture contents of the material in at least two different locations within the vessel. Further, prior to being introduced into the vessel, the air is heated as a function of given theoretical values. A biological filter is provided in the path of the exhaust air after it leaves the reaction vessel.

The various features of novelty which characterize the invention and are pointed out with particularity in the claims annexed to and forming a part of this disclosure. For a better understanding of the invention, its operating advantages and specific objects attained by its use, references should be had to the accompanying drawings and descriptive matter in which there is illustrated and described a preferred embodiment of the invention.

BRIEF DESCRIPTION OF THE DRAWING

In the drawing a schematic illustration is provided of an aeration reaction vessel and associated equipment including a biological filter for the exhaust air for digesting organic waste and/or sewage sludge, in accordance with the present invention, as it flows through the reaction vessel.

DETAILED DESCRIPTION OF THE INVENTION

In the drawing an aerating reaction vessel 1 covered by a heat insulation 2 is closed at its upper end by a cover 3 and is continuously charged through a gate valve 4 and device 5 with waste materials having a predetermined grain size and structure such as garbage and sewage sludge. Depending on the carbon content of the material being charged, optionally a carbon carrier, such as peat, straw or the like, is introduced with the material. Within the vessel, the material forms a vertically extending body 7 in which the material moves slowly downwardly from the top to the bottom of the vessel.

For effecting the continuous flow of the material, it is continuously removed at the base of the body 7 via a discharge device 9, for example, a screw, and is discharged from the vessel through an opening containing a slide valve 10.

Fresh air is introduced first through a blower 12 and passes through a pipe 13 in which a heating device 14 and a water-spraying device 15 are provided. The pipe 13 is connected to a distributor 17 located in the base of the vessel, the distributor being provided by a plurality of concentric pipes with a fine nozzle system in them so that a fine distribution of the air is provided in the direction of the arrows 8 into the base of the body 7. The air is introduced into the material so that it flows through its entire transverse cross-sectional area, that is, the area of the body extending transversely of the direction of travel of the material. Connected to the upper end of the reaction vessel 1, is a suction pipe 20 joined to a suction device 21. Another pipe 22 is connected to the outlet side of the suction device 21 and flows the exhaust air from the vessel through a heat exchanger 23 and a water separator 24. From the water separator 24, a pipe 25 conducts the exhaust air into a biological filter 26. A line 30 extends between the heat exchanger 23 and the heating device 14 so that the heat removed from the exhaust air can be used in heating the fresh air supplied to the lower end of the reaction vessel. Another line 48 extends from the water separator 24 to the water-spraying device 15 so that the water removed from the exhaust air can be used in the air introduced into the vessel. The water-spraying device 15 includes a controllable valve, not shown, by which the device is operated over a line 51 from a control circuit 38.

From the distributor 17, the air introduced by the blower 12 and withdrawn by the suction device 21, flows in the direction of the arrows 8 counter-current to the direction of the movement of the body 7 downwardly through the reaction vessel 1. Two probes 35, 36 are provided within the body 7 of the material being processed, one in the upper third and the other in the lower third of the body, for measuring the moisture content of the material at the probe location. The measured values are conducted to a meter 37 and to the mentioned control circuit 38.

In the outlet line 20 from the reaction vessel, another probe 40 is located for determining the $O_2$ or $CO_2$ content in the exhaust air discharged from the body of material in the vessel. The measured valve is supplied to an indicating device 41 and to another control circuit 42.

Additional measuring probes 44, 45 and 46 are located in spaced relation in the direction of the movement of the material through the vessel for determining the temperature distribution within the material which is exhibited in an indicating device 47. The indicating devices are preferably designed as recording indicating devices.

Via an input device 50, in which theoretical values are stored at least for the $CO_2$ content, for the moisture content within the body 7 and for the temperature of the air to be introduced, the control 38 receives a given theoretical value and is connected via line 51 with the water-spraying device 15 so that the fresh air has the desired moisture content.

The control circuit 42 also receives its theoretical or desired values from the input device 50 and is connected over a line 52 with the blower 12 and over a line 53 with the suction device 21.

As mentioned, the desired or theoretical values are stored in the input device 50. Additionally, other stored theoretical values may be provided concerning the power of the blower 12 and the suction device 21 and the pressure head in the distributor 17. By means of the control circuits 38 and 42, differences between the measured actual values and the desired values are noted and the inflow and outflow of the air provided by the blower 12 and the suction device 21 and the moisture of the inflowing air is regulated and the heating device is controlled. For effecting control of the heating device, it is connected to the input device 50.

The moisture of the material charged into the reactor vessel should be in the range of 40% to 70% and preferably about 55%. At the lower end or base of the body 7, the moisture content should be between 30 and 50%, and preferably about 40%. The quantity of fresh air introduced into the vessel should be about 100 $m^3$ to 300 $m^3$ for a volume of material of 100 $m^3$. Finally, the temperature in the upper third of the body 7 should be more than 70° C, in the middle third it should be between 50% and 70° C, and, in the lower third it should be about 40% to 50° C. The theoretical values for the input device should be provided accordingly, so that by way of the control circuits 38 and 42, the digestion process is controlled whereby the theoretical values establish themselves as actual values and this can be monitored visually via the indicating device. The theoretical value for the $CO_2$ content in the exhaust air is between 2% and 5% and preferably about 3.5%. Based on these theoretical values the supply of fresh air is regulated over the control circuit 42.

The biological filter 26 uses, as the absorbent, a body 52 of a highly biologically active digested organic material, preferably obtained in the inventive process. Such a filter has been described in detail, for example, in U.S. Application Ser. No. 615,732. The exhaust air from which the water has been removed, flows through pipe 25 into the body 52 in the direction of the arrows and exits from the body in an odorless and noxious matter free condition. After the absorption capacity of the body 52 has been exhausted, it should be regenerated or renewed.

As described above, after startup the continuously charged organic waste material, possibly enriched with a carbon carrier, moves downwardly through the reaction vessel 1 in a continuous manner from top to bottom and, in so doing, the material is digested by an aerobic bacterial activity and is continuously discharged through the valve 10 and in the lower end of the vessel. The oxygen required for the digesting process is supplied to the body 7 by the fresh air conducted through the vessel by the blower 12 and the suction device and the quantity of air is regulated as a function of the $CO_2$ or $O_2$ content of the exhaust air.

Moisture required for maintaining the biological digestion of the material is introduced into the vessel by automatically regulating the humidity or moisture content of the air as it flows from the blower 12 to the distributor 17. Heat carried out of the vessel by the exhaust air is removed in the heat exchanger 23 and the heat is conveyed to the heating device 14 in which the heat content of the fresh air is automatically controlled. As indicated above, the moisture content of the exhaust air is removed before it flows through the filter 26 and the recovered water is returned to the spraying device 15. Finally, before returning to the atmosphere, the exhaust air is filtered for removal of any odor or other noxious matter. Accordingly, the end product of the digestion process in the reaction vessel 1 is obtained in an automatic manner independent of the skills of the operating personnel. Further, the end product is very intensely permeated by microorganisms and is free of pathogenic bacilli and weed seeds, since due to the regulation of the quantity and condition of the air a supply of oxygen is provided flowing upwardly through the body 7 which favors bacterial growth and sufficient moisture is maintained so that the material does not completely dry out in the lower region of the vessel and optimum aerobic digesting conditions prevail throughout the reaction vessel.

The theoretical values given depend on the type and composition of the wastes being treated and the $CO_2$ or $O_2$ values, along with the moisture and the temperature values are easily determinable by experiment and ensure an adequate digesting process which is maintainable at all times.

While a specific embodiment of the invention has been shown and described in detail to illustrate the application of the inventive principles, it will be understood that the invention may be embodied otherwise without departing from such principles.

What is claimed is:

1. An improved method of continuously digesting material such as organic waste and/or sewage sludge, including the steps of feeding the material to be digested into the upper end of an enclosed space, withdrawing the material after being digested from the lower end of the enclosed space, aerating the material as it moves downwardly from the upper end to the lower end of the enclosed space, and adjustably supplying the air to the material as a function of values measured within the enclosed space, wherein the improvement comprises the steps of allowing the material to pass from the upper end of the enclosed space to the lower end thereof in a continuous body forming a single mass, finely distributing the total amount of air required for the digestion process of the material over the entire cross-sectional area of the lower end of the enclosed space so that the air supplied thereto contacts the entire cross-sectional area of the mass of material taken transverse to its direction of movement through the space as the air flows through said mass of material, in a direction opposite to the movement of the material through said enclosed space, adding a regulated amount of moisture to the air introduced into the enclosed space, withdrawing the air from the upper end of the enclosed space after its upward flow through the material, monitoring one of the $CO_2$ and $O_2$ content of the air withdrawn from the upper end of the closed space, comparing the actual value of the one of the $CO_2$ and $O_2$ content monitored with a predetermined desired value, regulating the flow of the air through the enclosed space based on the comparison of the desired and monitored values by separately controlling the introduction of air into the enclosed space and controlling the withdrawl of air therefrom thereby controlling pressure gradients in the various layers of said mass so as to adjust the oxygen level flowing through said mass in desired amounts, measuring the moisture content of the material in at least two locations spaced apart in the direction between the lower end and the upper end of the closed space, comparing the actual moisture content values with predetermined desired values, regulating the amount of finely divided water added into the air being supplied to the lower end of the enclosed space based on the comparison of the desired and measured values of moisture content, and heating the air supplied to the lower end of the enclosed space to a temperature in the range of 30° to 50° C.

2. The improved method, as set forth in claim 1, wherein the step of regulating the flow of air through the enclosed space comprises variably controlling both the introduction of air into the enclosed space by controlling compression blower forces applied thereto and the withdrawal of air from the enclosed space by controlling suction blower forces applied thereto.

3. The improved method, as set forth in claim 1, wherein the step of regulating the flow of air through the enclosed space comprises variably controlling only the withdrawal of air from the enclosed space while maintaining a fixed flow of air into the enclosed space.

4. The improved method, as set forth in claim 1, comprising the step of extracting heat from the air withdrawn from the upper end of the enclosed space, and transferring the extracted heat to the air supplied into the lower end of the enclosed space.

5. The improved method, as set forth in claim 4, comprising the step of removing the water content of the air withdrawn from the enclosed space, and returning the removed water content for introduction into the air being supplied to the lower end of the enclosed space.

6. The improved method, as set forth in claim 5, comprising the step of filtering the air withdrawn from the enclosed space after the removal of its heat and water content for deodorizing the air and rendering it free of noxious matter.

7. The improved method, as set forth in claim 1, comprising the further steps of filling the highly biologically active digested material from the pile removed from the lower end of the enclosed space in which the pile of material has been treated into a closed vessel forming a passageway having an inlet at one end thereof and an outlet at the other end thereof, flowing the air withdrawn from the enclosed space into the inlet of the closed vessel, finely distributing the air into the closed vessel so that it filters through the entire cross sectional area of the material in the vessel as taken transverse to the direction of flow through the passageway from the inlet to the outlet, and removing the filtered air from the outlet of the passageway in the closed vessel, whereby the filtered air is deodorized and free of noxious matter.

8. An apparatus for digesting material such as organic waste and/or sewage sludge comprising an enclosed vertically extending reaction vessel, a material inlet at an upper end of said reaction vessel and a material outlet at a lower end therof so that said material progresses in a continuous body forming a single mass from said inlet to said outlet, a distributor in the lower end of said reaction vessel for finely distributing a flow of air into the entire horizontal cross-sectional area of said reaction vessel, a blower and a conduit extending from said blower to said distributor for supplying air to said distributor, a suction device and an exhaust line connecting said suction device and the upper end of said reaction vessel for withdrawing air from within the upper end of said reaction vessel so that said air is caused to flow through said mass in a direction opposite to the movement of said material through said vessel, a first control circuit connected to said blower and suction device for separately regulating said blower and said suction device so as to cause said air flow to traverse the entire height and over the full cross-section of said continuous mass, said first control circuit including means for measuring one of the $CO_2$ and $O_2$ values in the air withdrawn from said reaction vessel so that based on a comparison of the actually measured values of the $CO_2$ or $O_2$ and a predetermined desired value at least one of the amount of air supplied to said blower and withdrawn by said suction device can be regulated, a spraying device for adding finely divided water into the air flow in said conduit between said blower and said distributor so as to moisturize the air supplied to said distributor, a second control circuit connected to said spraying device for regulating the amount of water supplied into the air, a heating device connected to said conduit for heating the air being supplied to said distributor, and a third control circuit connected to said heating device for regulating the amount of heat supplied to the air flowing from said blower to said distributor, and means connected to said first, second and third control circuits for determining desired degree of regulation effected by said circuits based on predetermined desired values as compared to actually measured values in said vessel.

9. The apparatus, as set forth in claim 8, further comprising an outlet line extending from said suction device for exhausting the air withdrawn from said reaction vessel away from said suction device, a heat exchanger in said outlet line for removing heat from the air flowing through said outlet line, a water separator in said outlet line for removing water from the air flowing through said outlet line, and a biological filter connected to an end of said outlet line located opposite from said suction device for filtering the air withdrawn by said suction device after the air has passed through said heat exchanger and water separator.

10. The apparatus, as set forth in claim 9, further comprising means connecting said heat exchanger to said heating device for supplying the heat removed from the air flowing through said outlet line to said heating device for heating the air being supplied by said blower into said reaction vessel.

11. The apparatus, as set forth in claim 10, wherein said means for determining said desired degree of regulation comprises a device connected to said first, second and third control circuits, said device incorporating storage units containing desired values for comparison with the actual values measured in said control circuits for effecting the desired regulation in said first, second and third control circuits.

* * * * *